US006785887B2

(12) United States Patent
Armstrong et al.

(10) Patent No.: US 6,785,887 B2
(45) Date of Patent: Aug. 31, 2004

(54) TECHNIQUE FOR USING SHARED RESOURCES ON A MULTI-THREADED PROCESSOR

(75) Inventors: William Joseph Armstrong, Mantorville, MN (US); Naresh Nayar, Rochester, MN (US); Kenneth Charles Vossen, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 09/749,107

(22) Filed: Dec. 27, 2000

(65) Prior Publication Data

US 2002/0083252 A1 Jun. 27, 2002

(51) Int. Cl.[7] ................................................ G06F 9/46
(52) U.S. Cl. ...................... 718/100; 718/107; 718/108
(58) Field of Search ............................... 718/100, 107, 718/108

(56) References Cited

U.S. PATENT DOCUMENTS 6,026,427 A * 2/2000 Nishihara et al. ........... 718/106
6,223,204 B1 * 4/2001 Tucker ....................... 718/103
6,697,834 B1 * 2/2004 Dice .......................... 718/102

* cited by examiner

Primary Examiner—Meng-Al T. An
Assistant Examiner—Diem Cao
(74) Attorney, Agent, or Firm—Christopher H. Lynt; Leslie J. Payne

(57) ABSTRACT

A method of handling conflicts between threads, including an initiating thread and at least one other thread, for at least one shared resource in a multi-threaded processing system having a processor and memory includes setting a location in memory for each other thread on the processor with the initiating thread. The initiating thread signals an inter-processor interrupt (IPI) to all other threads on the processor. For each other thread, an interrupt handler is initiated where each other thread: acknowledges receipt of the interrupt, and proceeds to spin on the respective location in memory that was set, thereby guaranteeing that the respective other thread will not be using any shared resource of the processor. The initiating thread waits for other threads on processor to acknowledge the inter-processor interrupt (IPI), and when all the other threads have acknowledged the inter-processor interrupt (IPI), the initiating thread proceeds to save the state of the shared resource in memory, sets the shared resource to the state wanted, uses the shared resource, and restores the original state of the resource. The initiating thread then releases the other threads from their spin by resetting the location in memory that was set above. All the threads then proceed with their computations.

18 Claims, 2 Drawing Sheets

TECHNIQUE FOR USING SHARED RESOURCES ON A MULTI-THREADED PROCESSOR

BACKGROUND OF THE INVENTION

1. Field of the Invention

The invention relates to the field of computer system operation control, and in particular, to hardware multi-threading where non-duplicated shared resources, such as special purpose registers, are used by multiple threads.

2. Background Information

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, central processing unit (CPU), etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Many modern computers support "multi-tasking" in which two or more programs are run at the same time. An operating system controls the alternating between the programs, and a switch between the programs or between the operating system and one of the programs is called a "context switch." Additionally, multi-tasking can be performed in a single program, and is typically referred to as "multi-threading." A technique to improve the efficiency of hardware within the central processing unit (CPU), or simply the "processor," is to divide a processing task into independently executable sequences of instructions called threads. This technique is related to breaking a larger task into smaller tasks for independent execution by different processors in a multiprocessor environment, except here the threads are to be executed by the same processor. When a CPU then, for any of a number of reasons, cannot continue the processing or execution of one of these threads, the CPU switches to and executes another thread.

Multiple actions can be processed concurrently using multi-threading. However, some resources may be shared by the threads and conflicts may result. For example, most modern computers include at least a first level and typically a second level cache memory system for storing frequently accessed data and instructions. With the use of multi-threading, multiple program threads are sharing the cache memory, and thus the data or instructions for one thread may overwrite those for another, increasing the probability of cache misses. The cost of a cache miss in the number of wasted processor cycles is increasing, due to the processor speed increasing at a higher rate than the memory access speeds. Thus, ironically, more processors cycles are required for memory accesses, rather than less, as speeds increase. Accordingly, memory accesses are becoming a limited factor on processor execution speed.

A technique for limiting the effect of slow memory accesses is a thread switch. A discussion of the effect of multi-threading on cache memory systems is set forth in the article "Evaluation of Multi-Threaded Uniprocessors for Commercial Application Environments" by R. Eickemeyer et al. of IBM, May 22–24, 1996, 23rd Annual International Symposium on Computer Architecture. The IBM article shows the beneficial effect of a thread switch in a multi-threaded processor upon a level 2 cache miss. The article points out that the use of separate registers for each thread and instruction dispatch buffers for each thread will affect the efficiency. The article assumes a non-blocking level 2 cache, meaning that the level 2 cache can continue to access for a first thread and it can also process a cache request for a second thread at the same time, if necessary. The IBM article points out that there exist fine-grain multi-threading processors which interleave different threads on a cycle-by-cycle basis. Coarse-grain multi-threading interleaves the instructions of different threads on some long-latency event (s). As pointed out in the IBM article, switching in the Tera supercomputer, which switches every cycle, is done in round-robin fashion. The Alewife project is cited as handling thread switching in software using a fast trap.

Therefore, modern microprocessors implement multi-threading to tolerate high latency events, like cache misses. In such implementations, the processor will have multiple (two or more) concurrent threads of execution. It should be noted here that the term "multithreading" as defined in the computer architecture community is not the same as the software use of the term, which means one task subdivided into multiple related threads. In the computer architecture definition, the threads may be unrelated, i.e., independent. Therefore, the term "hardware multithreading" is often used to distinguish the two uses of the term "multithreading". Also, as used herein in describing the invention, the term "threads" refers to hardware threads and is not to be confused with software threads.

Multi-threaded computer systems are computers with operating systems that allow a machine's resources, for example, central processing unit (CPU), input/output interface, memory, and peripherals, to be used by multiple instruction streams (threads) in parallel. In a multi-threaded computer environment, the operating system may allocate CPU processing among competing threads in a round robin fashion enabling parallel processing of instruction streams. When instruction streams are executing independent processes, multi-threaded environments are an efficient means to maximize use of CPU resources. However, in many cases instruction streams will have interdependencies created by references to certain types of variables in a computer program. Also, with multiple threads being processed in parallel, competition and conflict among the threads can occur.

U.S. Pat. No. 6,061,710 relates in general to a method for and apparatus of a computer data processing system; and in particular, to a multithreaded processor and method embodied in the hardware of the processor, in the presence of branch instructions.

There are two basic forms of multithreading. A traditional form is to keep N threads, or states, in the processor and interleave the threads on a cycle-by-cycle basis. The other form of multithreading is to interleave the threads on some long-latency event, such as a cache miss.

U.S. Pat. No. 5,933,627 relates to microprocessors which execute multi-threaded programs, and in particular to the handling of blocked (waiting required) memory accesses in such programs, and describes a method and apparatus for switching between threads of a program in response to a long-latency event. In one embodiment, the long-latency events are load or store operations which trigger a thread switch if there is a miss in the level 2 cache. In addition to providing separate groups of registers for multiple threads, a group of program address registers pointing to different threads are provided. A switching mechanism switches between the program address registers in response to the long-latency events.

Traditional forms of multithreading involve replicating the processor registers for each thread. For instance, for a processor implementing the architecture sold under the trade name PowerPC™ to perform multithreading, the processor must maintain N states to run N threads. Accordingly, the following resources are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. When one thread encounters a delay, the processor rapidly switches to another thread, so that the execution of this thread overlaps with the memory delay on the first thread.

Therefore, many, but not necessarily all, processor resources may be replicated on a per-thread basis. For example, some of the special-purpose registers (SPRs) might not be duplicated on a per-thread basis. That is, for some SPRs, there is only one per processor.

Therefore, a problem arises when the concurrently executing threads on a processor require the use of such a non-duplicated shared resource in conflicting modes. For example, a thread may require a certain bit pattern in an SPR for it to compute the correct results, while another concurrently executing thread may require a different bit pattern for it to compute the correct result.

Therefore, it would be advantageous to have an efficient way to resolve such conflicts for non-duplicated shared resources, such as special purpose registers.

It is also typical in modern computing systems to have critical sections of code, or shared data structures, such as shared libraries, whose integrity is extremely important to the correct operation of the system. Locks/mutexes (mutual exclusion locks) are, in general, devices employed in software (or hardware) to "serialize" access to these critical sections of code and/or shared data structures.

Two types of locks are often encountered in the art, namely blocking locks and simple or "spin" locks. Blocking locks are of the form which cause a thread requesting the lock to cease being executable, e.g., to go to "sleep" as the term is employed in the art, if the lock is currently held by another thread. Spin locks, in contrast, do not put waiting threads to "sleep", but rather, the waiting threads execute a spin loop, and thus repeatedly continue to request the lock until it is freed by the current thread "owner".

U.S. Pat. No. 6,112,222 discloses a method for obtaining a lock on a resource in a multi-thread computer environment. The method includes: determining whether one thread or multiple threads desire the resource lock; directly assigning resource ownership to the one thread when the determining determines that only the one thread is actively seeking a lock on the resource, the directly assigning employing a first lock process which comprises one of an operating system primitive lock process or a hardware lock process; and, employing a second lock process to obtain the lock on the resource when the determining determines that multiple threads concurrently desire ownership of the resource, the second lock process employing at least one function in the POSIX threads standard (basic thread management under the POSIX standard is described, for example, in a publication by K. Robbins and S. Robbins entitled Practical UNIX Programming—A Guide To Concurrency, Communication and Multi-threading, Prentice Hall PTR 1996). Also, a method for unlocking a lock on a resource in a multithread computer environment is provided therein. The lock employs a lock structure including a lock.owner field representative of thread ownership of the resource, a lock.status field representative of ownership of the lock structure, and a lock.waiters field representative of a count of threads waiting to obtain the lock. The method includes: obtaining control of the lock structure by setting the lock.status field; determining whether any threads are waiting for the lock by evaluating the lock.waiters field; and if no threads are waiting, directly setting the lock.owner field to null, otherwise employing at least one function in the POSIX threads standard to set the lock.owner field to null and issue a thread condition signal to waiting threads that the resource has been unlocked.

To summarize U.S. Pat. No. 6,112,222, a hybrid lock function (and/or macro) is disclosed which has minimal impact on performance when only a single thread is active, but which provides correct operation using mutex locks when multiple threads are active. When lock is to be acquired, the lock state is tested via AIX-provided atomic test functions. If the lock is unowned and if there are no waiters, the lock is claimed by the thread and ownership set via AIX-provided atomic functions. These have minimal overhead, and correspond to the case in which only one thread is trying to acquire the lock. However, if the lock is owned and/or there are already threads waiting to acquire the lock, the thread updates the wait count and does a POSIX thread condition wait, thus putting itself to sleep awaiting an unlock signal. When the current lock is released, a similar set of tests is performed by the releasor. If there are no waiters, the global ownership variable is atomically reset; otherwise, a POSIX thread signal is sent to awaken a waiting thread.

U.S. Pat. No. 6,049,867 relates to a method and system for multi-thread operation in a data processing system which includes a processor, a main memory store and at least two levels of cache memory. At least one instruction within an initial thread is executed. Thereafter, the state of the processor at a selected point within the first thread is stored, execution of the first thread is terminated and a second thread is selected for execution only in response to a level two or higher cache miss, thereby minimizing processor delays due to memory latency. The validity state of each thread is preferably maintained in order to minimize the likelihood of returning to a prior thread for execution before the cache miss has been corrected. A least recently executed thread is preferably selected for execution in the event of a non-validity indication in association with all remaining threads, in anticipation of a change to the valid status of that thread prior to all other threads. A thread switch bit may also be utilized to selectively inhibit thread switching where execution of a particular thread is deemed necessary.

The field of computer technology would be improved by an efficient way to resolve conflicts for non-duplicated shared resources, such as special purpose registers, in a hardware multi-threaded system.

SUMMARY OF THE INVENTION

It is, therefore, a principal object of the invention to provide a method and apparatus for using shared resources on a multi-threaded processor.

It is another object of the invention to provide a method and apparatus that solves the above mentioned problems so that conflicts for non-duplicated shared resources, such as special purpose registers, can be handled efficiently.

These and other objects of the present invention are accomplished by the method and apparatus disclosed herein.

According to an aspect of the invention, the problems in the prior art are solved by synchronizing access to the shared resource on the processor in a manner such that both of two competing/conflicting threads compute the correct results.

According to an aspect of the invention, the problems are solved by synchronizing the threads in software.

According to an aspect of the invention, when a thread knows that it wants to use a resource that is potentially going to be in a conflicting mode if another thread on the same processor wants to use the resource, it initiates an operation where it brings all the other threads on the processor into a known state.

According to an aspect of the invention, in this known state, the other threads are guaranteed to be not using the shared resource.

According to an aspect of the invention, the initiating thread then saves the state of the resource, sets it to the state it wants, uses it, restores the original state of the resource and releases the other threads so that they can proceed with their computation and potential use of the shared resource.

According to an aspect of the invention, the following sequence of actions occur: (1) the initiating thread sets a location in memory for each other thread on that processor; (2) the initiating thread then signals an inter-processor interrupt (IPI) to all other threads on the processor; (3) each other thread will get control in an interrupt handler (because of the IPI), where it acknowledges that it has received the interrupt and then proceeds to spin on the location in memory that was set for it in step (1), this guarantees that the thread will not be using any shared resource of the processor; (4) the initiating thread waits for the other threads on the processor to acknowledge the IPI. When all the threads have acknowledged, the initiating thread knows that it can use the shared resource; (5) it saves the state of the shared resource in memory, sets it to the state it wants, uses it and then restores the original state of the resource; (6) it then releases the other threads from their spin by resetting the location in memory that was set in (1); (7) all threads proceed with their computations.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

As mentioned above in the Summary section above, this invention solves the problem when the concurrently executing threads on a processor require the use of a non-duplicated shared resource in conflicting modes. For example, a thread may require a certain bit pattern in a special purpose register (SPR) for it to compute the correct results, while another (concurrently) executing thread may require a different bit pattern in the SPR for it to compute the correct result.

The invention provides an efficient way to resolve such conflicts for such non-duplicated shared resources, such as special purpose registers by synchronizing access to the shared resource on the processor in a manner such that both of two competing/conflicting threads compute the correct results. In other words, the invention solves the above problem by synchronizing the threads in software, as will now be described in more detail.

When a thread knows that it wants to use a resource that is potentially going to be in a conflicting mode if another thread (on the same processor) wants to use the resource, it initiates an operation where it brings all the other threads on the processor in a known state. In this known state, the other threads are guaranteed to be not using the shared resource. The initiating thread then saves the state of the resource, sets it to the state it wants, uses it, restores the original state of the resource and releases the other threads so that they can proceed with their computation and potential use of the shared resource.

Figure 1:
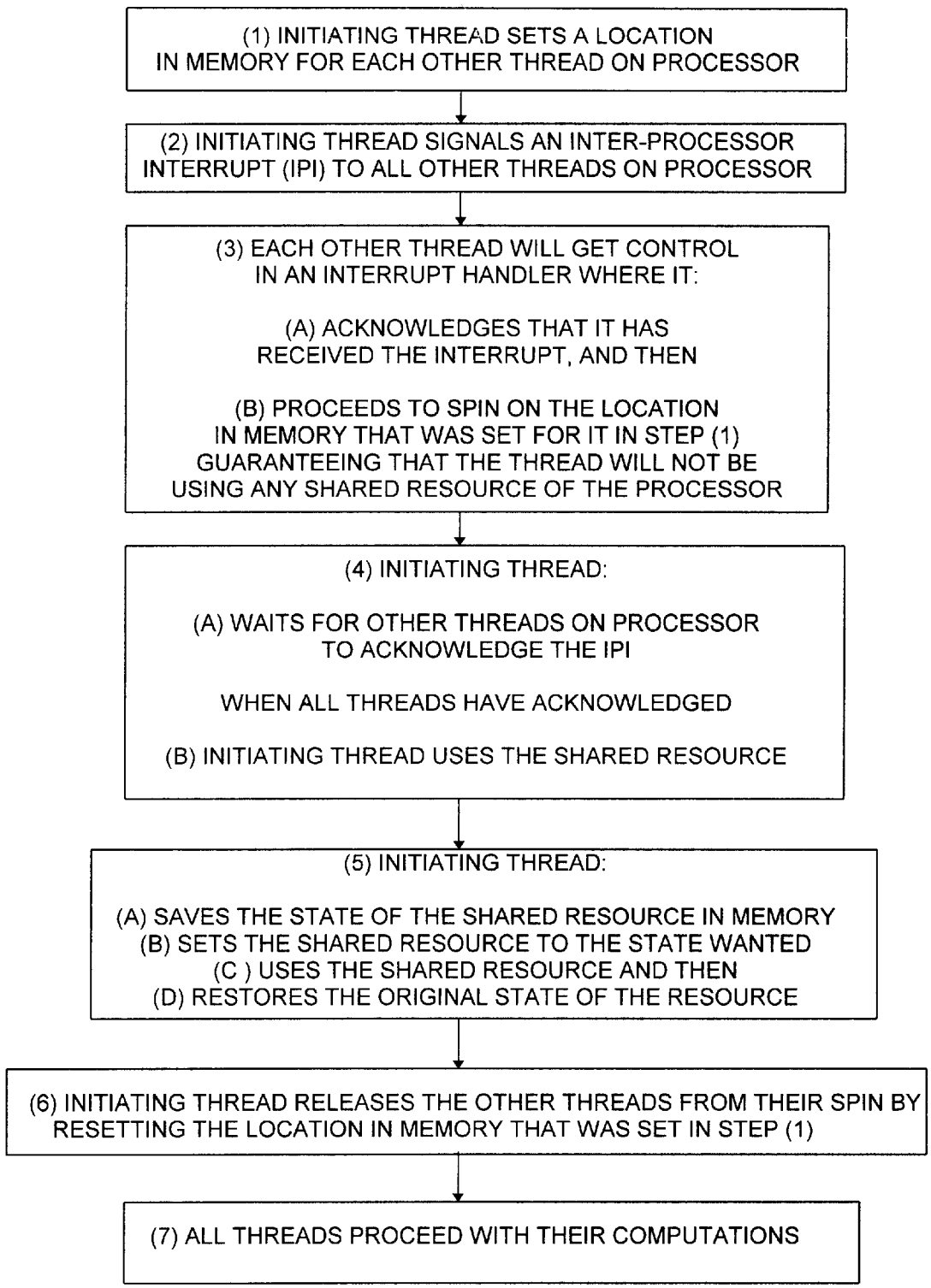
FIG. 1 illustrates a flow chart of a process according to an exemplary embodiment of the present invention.

According to an exemplary embodiment of the invention, the following sequence of actions occur (see FIG. 1):

1. An initiating thread sets a location in memory for each other thread on that processor.
2. The initiating thread then signals an inter-processor interrupt (IPI) to all other threads on the processor.
3. Each other thread will get control in an interrupt handler (because of the IPI), where it acknowledges that it has received the interrupt and then proceeds to spin on the location in memory that was set for it in step 1. This guarantees that the thread will not be using any shared resource of the processor.
4. The initiating thread waits for the other threads on the processor to acknowledge the IPI. When all the threads have acknowledged, the initiating thread knows that it can use the shared resource.
5. It saves the state of the shared resource in memory, sets it to the state it wants, uses it and then restores the original state of the resource.
6. It then releases the other threads from their spin by resetting the location in memory that was set in 1.
7. All threads proceed with their computations.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

Figure 2:
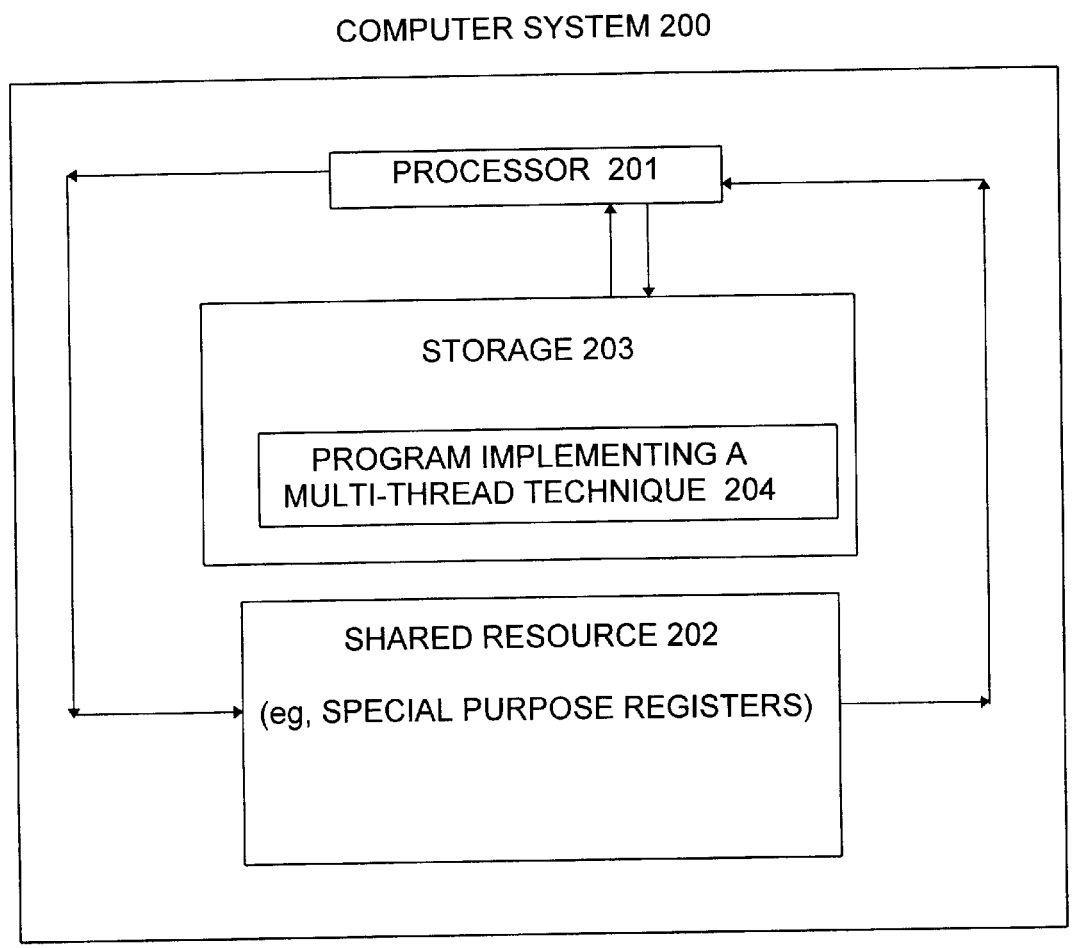
FIG. 2 illustrates a system for implementing the process of FIG. 1, according to an exemplary embodiment of the invention.

A computer system 200 for implementing the invention is illustrated in FIG. 2, and includes at least a processor 201, a shared resource, such as special purpose registers, 202, and storage (e.g., memory) 203 for storing program instructions implementing the inventive method 204, and data, for example.

It will be apparent to one skilled in the art that the manner of making and using the claimed invention has been adequately disclosed in the above-written description of the preferred embodiment(s) taken together with the drawings. It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of handling conflicts between threads, including an initiating thread and at least one other thread, for at least one shared resource in a multi-threaded processing system having a processor and memory, comprising:
   (1) with the initiating thread, setting a location in memory for each other thread on the processor;
   (2) with the initiating thread, signaling an inter-processor interrupt (IPI) to all other threads on the processor;
   (3) for each other thread, initiating an interrupt handler where each other thread:
      (a) acknowledges receipt of the interrupt; and
      (b) proceeds to spin on the respective location in memory that was set in step (1), thereby guaranteeing that the respective other thread will not be using any shared resource of the processor;
   (4) the initiating thread:
      (a) waits for other thread on processor to acknowledge the inter-processor interrupt (IPI); and
      (b) when all the other threads have acknowledged the inter-processor interrupt (IPI), the initiating thread proceeds to step (5);
   (5) the initiating thread:
      (a) saves the state of the bared resource in memory;
      (b) sets the shared resource to the state wanted;
      (c) uses the shared resource; and
      (d) restores the original state of the resource;
   (6) the initiating thread leases the other threads from their spin by resetting the location in memory that was set in step (1); and
   (7) all the threads proceed with their computations.

2. The method according to claim 1, wherein the at least one shared resource comprises a special purpose register.

3. The method according to claim 2, wherein the at least one shared resource comprises a non-duplicated, special purpose register.

4. The method according to claim 3, wherein the at least one shared resource comprises a plurality of non-duplicated, special purpose registers.

5. The method according to claim 1, wherein the at least one other thread comprises a plurality of threads.

6. The method according to claim 5, wherein the at least one shared resource comprises a special purpose register.

7. The method according to claim 6, wherein the at least one shared resource comprises a non-duplicated, special purpose register.

8. The method according to claim 7, wherein the at least one shared resource comprises a plurality of non-duplicated, special purpose registers.

9. A computer program product including a recording medium, the recording medium having program instructions stored thereon for implementing the method of handling conflicts between threads, including an initiating thread and at least one other thread, for at least one shared resource in a multi-threaded processing system having a processor and memory, comprising:
   (1) with the initiating thread, setting a location in memory for each other thread on the processor;
   (2) with the initiating thread, signaling an inter-processor interrupt (IPI) to all other threads on the processor;
   (3) for each other thread, initiating an interrupt handler where each other thread:
      (a) acknowledges receipt of the interrupt; and
      (b) proceeds to spin on a respective location in memory that was set in step (1), thereby guaranteeing that the respective other thread will not be using any shared resource of the processor;
   (4) the initiating thread;
      (a) waits for other threads on processor to acknowledge the inter-processor interrupt (IPI); and
      (b) when all the other threads have acknowledged the inter-processor interrupt (IPI), the initiating thread proceeds to step (5);
   (5) the initiating thread:
      (a) saves the state of the shared resource in memory;
      (b) sets the shared resource to the state wanted;
      (c) uses the shared resource; and
      (d) restores the original state of the resource;
   (6) the initiating thread releases the other threads from their spin by resetting the location in memory that was set in step (1); and
   (7) all the threads proceed with their computations; wherein the at least one shared resource comprises a special purpose register; wherein the at least one shared resource comprises a non-duplicated, special purpose register; wherein the at least one shared resource comprises a plurality of non-duplicated, special purpose registers; wherein the at least one other thread comprises a plurality of threads; wherein the at least one shared resource comprises a special purpose register; wherein the at least one shared resource comprises a non-duplicated, special purpose register; and, wherein the at least one shared resource comprises a plurality of non-duplicated, special purpose registers.

10. A computer program product including a recording medium, the recording medium having program instructions stored thereon for implementing the method of handling conflicts between threads, including an initiating thread and at least one other thread, for at least one shared resource in a multi-threaded processing system having a processor and memory, comprising:
   (1) with the initiating thread, setting a location in memory for each other thread on the processor;
   (2) with the initiating thread, signaling an inter-processor interrupt (IPI) to all other threads on the processor;
   (3) for each other thread, initiating an interrupt handler where each other thread:
      (a) acknowledges receipt of the interrupt; and (b) proceeds to spin on the respective location in memory that was set in step (1), thereby guaranteeing that the respective other thread will not be using any shared resource of the processor;

(4) the initiating thread:
  (a) waits for other threads on processor to acknowledge the inter-processor interrupt (IPI); and
  (b) when all the other threads have acknowledged the inter-processor interrupt (IPI), the initiating thread proceeds to step (5);

(5) the initiating thread:
  (a) saves the state of the shared resource in memory;
  (b) sets the shared resource to the state wanted;
  (c) uses the shared resource; and
  (d) restores the original state of the resource;

(6) the initiating thread releases the other threads from their spin by resetting the location in memory that was set in step (1); and (7) all the threads proceed with their computation.

11. A multi-threaded computer system comprising:
a processor;
at least one shared resource; and
memory for storing a program instructions and data;
wherein the program instructions are executed by the processor to implement the method of handling conflicts between threads, including an initiating thread and at least one other thread, for at least one shared resource in a multi-threaded processing system having a processor and memory, comprising:

(1) with the initiating thread, setting a location in memory for each other thread on the processor;

(2) with the initiating thread, signaling an inter-processor interrupt (IPI) to all other threads on the processor;

(3) for each other thread, initiating an interrupt handler where each other thread:
  (a) acknowledges receipt of the interrupt; and
  (b) proceeds to spin on the respective location in memory that was set in step (1), thereby guaranteeing that the respective other thread will not be using any shared resource of the processor;

(4) the initiating thread:
  (a) waits for other threads on processor to acknowledge the inter-processor (IPI); and
  (b) when all the other threads have acknowledged the inter-processor interrupt (IPI), the initiating thread proceeds to step (5);

(5) the initiating thread:
  (a) saves the state of the shared resource in memory;
  (b) sets the shared resource to the state wanted;
  (c) uses the shared resource; and
  (d) restores the original state of the resource;

(6) the initiating thread releases the other threads from their spin by resetting the location in memory that was set in step (1); and (7) all the threads proceed with their computations.

12. The computer system according to claim 11, wherein the at least one shared resource comprises a special purpose register.

13. The computer system according to claim 12, wherein the at least one shared resource comprises a non-duplicated, special purpose register.

14. The computer system according to claim 13, wherein the at least one shared resource comprises a plurality of non-duplicated, special purpose registers.

15. The computer system according to claim 11, wherein the at least one other thread comprises a plurality of threads.

16. The computer system according to claim 15, wherein the at least one shared resource comprises a special purpose register.

17. The computer system according to claim 16, wherein the at least one shared resource comprises a non-duplicated, special purpose register.

18. The computer system according to claim 17, wherein the at least one shared resource comprises a plurality of non-duplicated, special purpose registers.

* * * * *